April 22, 1941.   C. C. NELSON   2,239,244
SYNCHRONOUS MOTOR CONTROL SYSTEM
Filed Nov. 17, 1938   2 Sheets-Sheet 1

INVENTOR.
Carl C. Nelson
BY Akel C. Benson
HIS ATTORNEY.

April 22, 1941. C. C. NELSON 2,239,244
SYNCHRONOUS MOTOR CONTROL SYSTEM
Filed Nov. 17, 1938 2 Sheets-Sheet 2

INVENTOR.
Carl C. Nelson
BY Akel C. Benson
HIS ATTORNEY.

Patented Apr. 22, 1941

2,239,244

UNITED STATES PATENT OFFICE 2,239,244

SYNCHRONOUS MOTOR CONTROL SYSTEM

Carl C. Nelson, Minneapolis, Minn., assignor to Electric Machinery Mfg. Company, Minneapolis, Minn.

Application November 17, 1938, Serial No. 240,961

2 Claims. (Cl. 171—118)

My invention relates to synchronous motor control systems and has for an object to provide a system in which a synchronous motor may be interlocked with another synchronous motor at predetermined relative rotor angles so that the connected driven machines, especially those of the reciprocating type such as compressors, can be continuously driven at a predetermined angular difference with respect to common or similar parts.

Another object of the invention resides in providing a system in which one synchronous motor may be synchronized when the rotor thereof occupies a predetermined rotor angle relative to the rotor of another running synchronous motor.

A still further object of the invention resides in providing a system in which either of two synchronous motors may be started and synchronized and the other thereof subsequently started and synchronized at a predetermined relative rotor angle with respect to the first synchronized motor.

An object of the invention resides in providing each of the synchronous motors with interlocking devices and in providing means controlled by both of said interlocking devices for synchronizing one of the motors.

Another object of the invention resides in utilizing interlocking contact devices operated by each of said motors and in employing a circuit including both of said interlocking contact devices for synchronizing one of the motors.

A feature of the invention resides in the specific construction of the interlocking contact devices.

Other objects of the invention reside in the novel combination and arrangement of parts and in the details of construction hereinafter illustrated and/or described.

Figure 1:
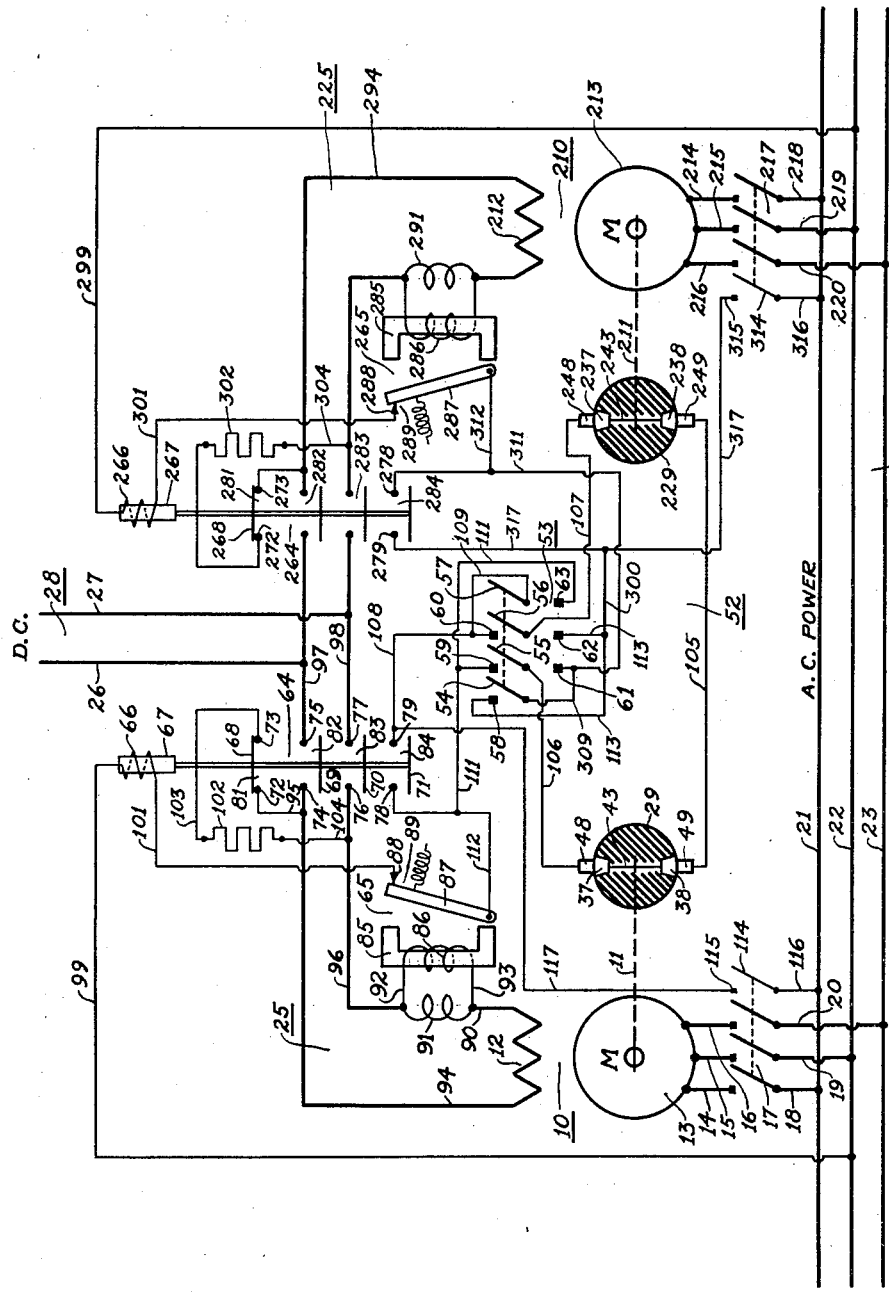
Fig. 1 is a wiring diagram of a synchronous motor control system illustrating an embodiment of my invention.

In the concurrent operation of compressors and similar reciprocating machines driven by synchronous motors and particularly machines which require varying torque, it becomes highly desirable to operate the machines so that the maximum power consumption required by one machine occurs during the minimum power consumption required by the other machine. The present invention provides a system by means of which this desired operation driven by two synchronous motors can be readily and easily procured. Synchronous motors, when synchronized by applying field excitation, hold their relative rotor positions with respect to each other due to the synchronous operation in unison with the frequency of the electric power line.

My invention is used with two synchronous motors which are indicated by the reference characters 10 and 210 in the drawings. The motor 10 has a rotor mounted on a rotor shaft 11. The said motor further includes a field winding 12 and a conventional squirrel-cage winding (not shown) on the rotor. An alternating-current winding 13 of the motor 10 is connected by means of conductors 14, 15 and 16 to a line switch 17, which in turn is connected by means of conductors 18, 19 and 20 to the three conductors 21, 22 and 23 of an alternating-current power line 24. In most motors, the field winding 12 is mounted on the rotor and the alternating-current winding 13 is mounted on the stator of the motor, and in other motors the reverse construction is employed. My invention operates equally well with either type of motor. The field winding 12 is connected in a circuit 25 which I have termed a control circuit and which is adapted to be connected to the conductors 26 and 27 of a direct-current line 28, as will be hereinafter more fully described.

The motor 210 is constructed similar to the motor 10 and is connected up to the electric power line 24 in the same manner. Likewise the other apparatus associated with the said motor and the circuits connected therewith are similar and therefore the description thereof will not be repeated and the same reference numerals of a denomination of 200 greater will be used to designate the corresponding parts.

Figure 2:
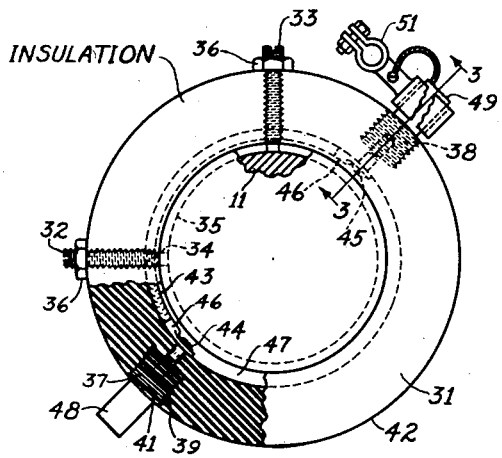
Fig. 2 is a fragmentary elevational view showing a portion of a synchronous motor with one of the interlocking contact devices of my invention applied thereto.
Figure 3:
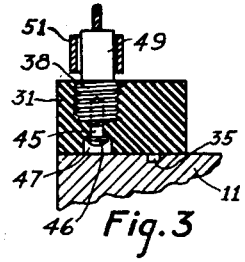
Fig. 3 is a sectional detail view taken on line 3—3 of Fig. 2.

Mounted on the two rotor shafts 11 and 211 are interlocking contact devices 29 and 229 which may be identical in construction. For this reason only the interlocking contact device 29 will be described in detail, which is best shown in Figs. 2 and 3. This device is mounted on the rotor shaft 11 of motor 10 or the same may be attached to any part of the rotating portion of the motor. For the purpose of describing the invention, it will be assumed that the same is rigidly affixed to the shaft 11. This device includes a ring 31 constructed of insulating material such as one of the mica preparations or one of the phenol formaldehyde preparations, which fits snugly upon the outer periphery of the shaft 11. The said ring is held in position by means of two set screws 32 and 33 which have doweled ends 34 adapted to be received in a groove 35 formed in the periphery of the shaft 11. The set screws 32 and 33 extend outwardly beyond the periphery of the ring 31 and have mounted on them jam nuts 36 which hold said set screws in the desired locked position. By means of said set screws and groove 35, the ring 31 may be affixed at any circumferentially adjusted position relative to the rotor shaft 11.

Mounted in the insulating ring 31 at diametrically opposite positions are two electrical contacts 37 and 38, preferably made of aluminum which wears more in accordance with the wear on the ring 31. These contacts may be in the form of threaded plugs which are screwed into threaded openings 39 formed in the outer portions of the said ring. The outer surfaces 41 of said plugs are flush with the outer periphery 42 of the ring 31. The two plugs 37 and 38 are electrically connected together by means of a conductor 43 which is attached at its ends to the two plugs by means of screws 44 and 45 which pass through suitable connectors 46 at the ends of said conductor and which extend through a portion of the ring 31 and are threaded into the contacts 37 and 38. The heads of the said screws and the conductor 43 are contained within a groove 47 formed in the inner periphery of the ring 31. Co-operating with the contacts 37 and 38 are two brushes 48 and 49 which are mounted in suitable brush holders 51 carried by the frame of the motor 10. These brush holders are insulated from each other and from the motor frame, and are connected in an interlocking circuit, which I have indicated in its entirety by the reference numeral 52.

In the operation of my invention, either synchronous motor 10 or motor 210 may be first started and synchronized and the other motor subsequently started and synchronized at a predetermined relative rotor angle with respect to the first running synchronous motor. This is made possible through a selector switch which I have indicated in its entirety by the reference numeral 53. This selector switch has been shown in its simplest form as a double-throw knife switch, though it can readily be comprehended that any switch such as is now well known in the art, either manually or electrically operated, may be used for the purpose. The selector switch 53, as illustrated, comprises four knife blades 54, 55, 56 and 57 which are simultaneously operated. The knife blades 54, 55 and 56 are adapted to be connected to fixed contacts 58, 59 and 60 when the said knife blades are swung in one direction; and the knife blades 55, 56 and 57 are adapted to be connected to contacts 61, 62 and 63 when the knife blades are swung in the opposite direction. When the knife blades are swung into their upward position, as shown in Fig. 1, motor 210 may be started and synchronized immediately. Thereafter the motor 10 may be started and becomes automatically synchronized at the desired relative rotor angle with respect to the running motor 210. When the knife blades are swung to their lower position, the motor 10 may be first started and synchronized, and the motor 210 subsequently started and automatically synchronized at the desired relative rotor angle with respect to the running motor 10.

For synchronizing the motor 10 with respect to the frequency of the power line 24, a field switch 64 and a field control relay 65 are employed. These parts will now be described in detail.

The field switch 64 is electrically operated and includes an operating coil 66 and an armature 67 operated thereby. Armature 67 carries four contact bars 68, 69, 70 and 71. The contact bar 68 is adapted to engage two fixed contacts 72 and 73. The contact bar 69 is adapted to engage two fixed contacts 74 and 75. Contact bar 70 is adapted to engage two fixed contacts 76 and 77 and contact bar 71 is adapted to engage two fixed contacts 78 and 79. These various contacts and contact bars form separate switches which are indicated in their entireties by the reference numerals 81, 82, 83 and 84 respectively. The switch 81 is a normally-closed switch, while the switches 82, 83 and 84 are normally open.

The field control relay 65 includes a core 85 which has mounted on it a coil 86 having a relatively high resistance. Adapted to be attracted to the core 85 is a relay armature 87 which, when not attracted to the core 85, makes a normally-closed contact with a fixed contact 88. This normally-closed contact and the said armature form a switch which I have indicated in its entirety by the reference numeral 89. Operating in conjunction with the coil 86 is a reactor 91 which has a relatively low resistance. This reactor is electrically connected in parallel with the coil 86 by means of conductors 92 and 93.

The control circuit 25 includes a conductor 94 which is connected to one side of the field winding 12 and to the fixed contact 74 of switch 82. A conductor 96 is connected to the reactor 91 and to the contact 76 of switch 83. The other end of reactor 91 is connected to the field winding 12 of motor 10 by means of a conductor 90. Two conductors 97 and 98 are connected to contacts 75 and 77 of switches 82 and 83 and to the conductors 26 and 27 of the direct-current line 28. It will readily be comprehended that, when the two switches 82 and 83 are closed, direct current is furnished to the field winding 12, whereby the motor becomes synchronized with the power line 24.

The field switch 64 is connected in the following manner: Connected to one end of the coil 66 is a conductor 99 which is connected to the conductor 22 of the power line 24. Connected to the other end of coil 66 is a conductor 101 which is connected to the contact 88 of switch 89. In conjunction with the motor 10 a field discharge resistor 102 is employed. This discharge resistor is connected by means of a conductor 103 with the contact 73 of switch 81. Another conductor 95 is connected to the conductor 94 and to the contact 72 of switch 81. The said field discharge resistor is further connected by means of a conductor 104 to the conductor 96, previously referred to. Since the switch 81 is normally closed, the field resistor 102 is normally connected across the field winding 12 so that the alternating current induced therein upon starting of the motor passes through the resistor 102. When the switch 64 is energized, switch 81 opens and the field discharge resistor 102 is disconnected from the field winding 12 and the control circuit 25 connected to the direct-current line 28.

The interlocking circuit 52 consists of a conductor 105 which connects brush 49 of the interlocking contact device 29 to the brush 249 of the interlocking contact device 229. Another conductor 106 connects the brush 48 to the knife blade 55 of selector switch 53. Similarly, the brush 248 of the interlocking contact device 229 is connected by means of a conductor 107 to the knife blade 56 of said switch. Selector switch 53 has in addition connected to it the following conductors: A conductor 108 connects the contact 60 of switch 53 to the contact 79 of the switch 84 on field switch 64. A conductor 109 connects the conductor 108 to the knife blade 57. Another conductor 111 connects conductor 112 to the contacts 59 and 63 of selector switch 53. Conductor 112 is in turn connected to armature 87 of relay 65 and to the contact 78 of the field switch 64. A conductor 113 connects contact 58 of selector switch 53 to the contact 62 of said switch.

The line switch 17, for energizing the alternating-current winding 13 of motor 10, includes an additional knife blade 114 and a fixed contact 115. The knife blade 114 is connected by means of a conductor 116 to the conductor 21 of power line 24. Contact 115 is connected by means of a conductor 117 with the conductor 108, previously referred to.

The motor 210 is synchronized by means of a field control relay 265 and a field switch 264 which are similar to control relay 65 and field switch 64 respectively. This apparatus, together with a field discharge resistor 302, are all connected in the same manner as the apparatus for motor 10. The description thereof will therefore not be repeated and the same reference numerals of a denomination of 200 greater than those used to designate the apparatus and circuits of motor 10 will be used to designate corresponding parts of motor 210 and the associated devices and circuits. In the connection of the various conductors of the circuits a few changes will be noted. Conductor 317, which is connected to contact 315, is connected to conductor 113 through a conductor 300, as well as to contact 279. Also the conductor 312, which is connected to contact 278, is connected to another conductor 311 which in turn is connected to the contact 61 and to a conductor 309. Conductor 309 is connected to contact 61 and to the knife blade 54 of switch 53.

The operation of the invention is as follows: Assume that it is desired to first start and synchronize motor 10. This is accomplished by throwing the knife blade of selector switch 53 downwardly and by closing the line switch 17. The following circuits would then be established. Conductors 18, 19 and 20 would immediately be connected to conductors 14, 15 and 16 and the alternating-current winding 13 of the motor 10 is energized from the alternating-current power line 24. Control circuit 25 is normally open through the switches 82 and 83 of the field switch 64. However, the field winding circuit is closed through the field discharge resistor 102. Assuming the synchronous motor 10 is of the type having a squirrel-cage winding for starting, the motor starts and accelerates, and alternating current is induced in the field winding 12, which flows through the field winding circuit. The alternating current induced in the field winding 12 flows through conductor 94, conductor 95, the normally-closed switch 81, conductor 103, and field discharge resistor 102, conductor 104, conductor 96, and then divides passing partly through the reactor 91 and partly through the coil 86, conductor 90, and back to the field winding 12. At the instant of starting the frequency of the alternating current induced in the field winding 12 is equal to line frequency. The reactor 91 therefore serves as a choke so that an appreciable portion of the current passes through the coil 86, which current is sufficient to immediately close the relay armature 87 and open switch 89 before coil 66 of field switch 64 can operate the armature 67. This opens the circuit through the coil 66 so that the field switch 64 remains in normal position, as shown in Fig. 1. As the motor 10 accelerates, the frequency of the induced field current decreases until the speed reaches a point at which it becomes desirable to energize the field winding 12 with direct current. At this point, the amount of induced field current passing through the coil 86 becomes exceedingly small due to the high resistance of the coil and the low reactance of the reactor 91 so that the relay armature 87 opens and thereby closes switch 89. This establishes a circuit through the coil 66 of field switch 64 and closes said field switch. When the line switch 17 was closed, knife blade 114 also closed the switch to contact 115. The circuit through coil 66 may be traced as follows: Commencing with conductor 21 of the power line 24, current flows through conductor 116, knife blade 114, contact 115, conductor 117, conductor 108, conductor 109, knife blade 57, contact 63, conductors 111 and 112, relay armature 87, switch 89, conductor 101, coil 66 of field switch 64, and conductor 99 to the conductor 22 of the power line 24. Upon actuation of switch 64, switch 81 is opened and the discharge resistor 102 is disconnected from the circuit. At the same time, switches 82 and 83 are closed and direct current from line 28 is applied to the field winding 12. When switches 82 and 83 close, conductors 97 and 98 are connected to the conductors 94 and 96 and the motor becomes synchronized and thereafter operates as a synchronous motor.

As soon as the motor 10 commences to rotate the brushes 48 and 49 ride on the surface of the ring 31 and whenever the electrical contacts 37 and 38 pass the brushes, the circuit 52 is momentarily closed by the interlocking contact device 29. If the motor 210 is now started by closing line switch 217, the interlocking contact device 229 thereof operates in identically the same manner. When the contacts 237 and 238 thereof come opposite the brushes 248 and 249, the interlocking circuit 52 is further closed. This circuit also includes the switch 289 which, when the motor 210 is first operated, is immediately opened so that the circuit through the coil 266 of field switch 264 is open. When, however, the motor 210 comes up to the desired speed near synchronism, the armature 287 of the field control relay 265 opens and closes the switch 289. The interlocking circuit 52 can now be electrically closed when the two interlocking contact devices 29 and 229 both close the circuit at the same time. As soon as this occurs, the field switch 264 is operated and the field winding 212 of the motor 210 is energized and thereafter operates as a synchronous motor. When this occurs, the following circuit can be traced: Commencing with conductor 21 of power line 24, current flows through the conductor 316, knife blade 314, contact 315, conductor 317, conductor 300, and conductor 113, contact 62 of switch 53, knife blade 56, conductor 107, brush 248, contact 237, conductor 243, contact 238 and through brush 249. From brush 249, the current flows through conductor 105, brush 49, contact 38, conductor 43, contact 37 and to brush 48. From brush 48 the current flows through conductor 106, knife blade 55, contact 61, conductors 311 and 312, and relay armature 287, of the field control relay 265. Since the switch 289 is closed, the current then flows through this switch through contact 288, conductor 301, coil 266 of switch 264 and conductor 299 to the conductor 22 of power line 24. This energizes the field switch 264 and the same closes. Upon closing of this switch, the two switches 282 and 283 are closed and the field winding 212 of motor 210 excited from the direct-current line 28. At the same time, switch 281 is opened which disconnects the field discharge resistor 302 from the field winding 212.

Inasmuch as the brushes of the interlocking devices 29 and 229 maintain only an instant electrical contact, the switch 264 would drop out and open the circuit which energizes field winding 212 with direct current. To prevent this, a sealing switch is used, which is the switch 284 of the field switch 264. This switch shunts the two interlocking devices 29 and 229. The circuit for procuring this result may be traced as follows: Commencing with contact 315, the current flows through conductor 317 and instead of passing through conductors 300 and 113, the knife blade 56 and the two interlocking devices 29 and 229, the current flows through the conductor 317, switch 284 and conductor 312 to the relay armature 287. From this armature, the current then flows as before through the switch 289 and the coil 266 of switch 264 and back to the conductor 22 of power line 24. In this manner, current is maintained in the coil 266 independently of the interlocking devices 29 and 229 and the motor 210 remains excited until the motor is shut down by opening line switch 217. When the line switch 217 is open for shutting down motor 210, the circuit through the coil 266 is broken through knife blade 314 and contact 315 so that field excitation is thereby removed. The same is true with the synchronous motor 10 when its line switch 17 is opened. If, at any time, this motor is shut down by opening line switch 17, current through the coil 66 is cut off and field excitation is thereby removed.

Due to the location of the two rings 31 of the interlocking devices 29 and 229 with respect to the motors on which they are mounted, the two motors cannot be synchronized until they have the desired predetermined relative rotor angles. By adjusting the position of the rings 31 on the rotor shaft 11 by means of the set screws 32 and 33, the two motors may be synchronized for any desired relative rotor angle with respect to each other. If the two motors were operating compressers of the double acting type, it would be highly desirable to have the motors operating so that, when one motor was drawing maximum power current during compression in the compressor operated thereby, the other motor would be so synchronized that it would be drawing minimum power current. The relative angle between the rotors would then be substantially 90 degrees and the motors acting together would draw a more uniform current from the power line 24 than if the motors were both drawing maximum power current at the same instants of time.

From an inspection of the wiring diagram, it will readily become apparent that the motor 210 may first be started if desired and the motor 10 subsequently synchronized and synchronization procured at the same relative rotor angle. In this case, the selective switch 53 is swung upwardly. In such case, similar circuits are made, the control circuit 225 through the field winding 212 being independent of the interlocking circuit 52 and the control circuit 25 being connected to the interlocking circuit 52. Due to the similarity of the circuits, the various circuits will not be again traced, although the same will be readily understood from the drawings.

Figure 4:
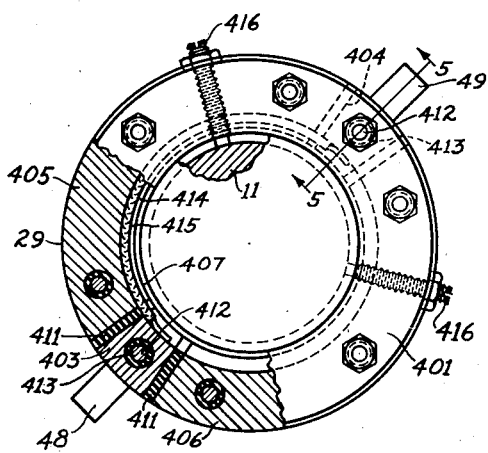
Fig. 4 is a view similar to Fig. 2 showing a modification of the invention.
Figure 5:
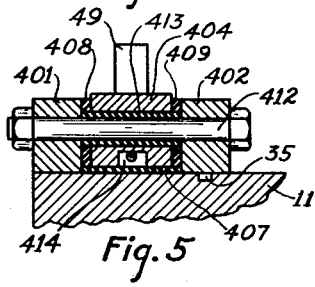
Fig. 5 is a cross sectional view taken on line 5—5 of Fig. 4.

To reduce wear on the insulating ring of the interlocking contact device shown in Figs. 2 and 3, a construction such as shown in Figs. 4 and 5 may be employed. The contact device here illustrated utilizes two metal rings 401 and 402. Between these rings is mounted two contact segments 403 and 404 and two brush riding segments 405 and 406. All of these segments are of the same diameter and width. Between these segments and the shaft 11, is provided an insulating sleeve 407. Between the segments and the rings 401 and 402 are provided insulating rings 408 and 409. The segments are separated by insulating bars 411. All of the parts are tied together through bolts 412 which are insulated from the segments and rings through insulating sleeves 413. In the segment 405 is formed a groove 414 in which a conductor 415 is provided which conductor is connected to the segments 403 and 404. The interlocking contact devices shown in Figs. 4 and 5 are attached to the shaft 11 by means of set screws 416, similar to the set screws 32 and 33 used with the other form of the invention which are threaded in the ring 31.

Figure 6:
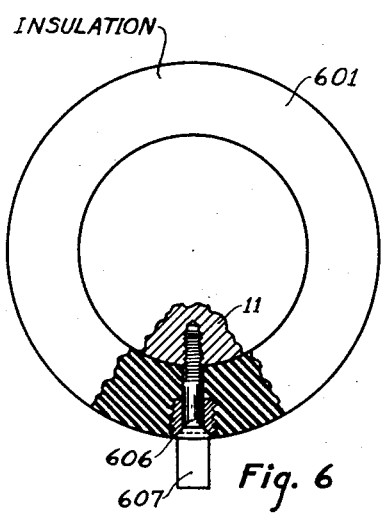
Fig. 6 is a view similar to Fig. 2 of still another form of interlocking contact device.

Instead of using the two brushes and the two contact segments, as shown in the devices (Figs. 2 and 4), a single brush and a single contact segment on each motor may be employed, as illustrated in Fig. 6. In this case an insulating ring 601 is employed and a single contact 606 utilized. With this construction, only one brush 607 on each motor is employed, when brush rides along the surface of the contact 606 and ring 601. The other brush in this case may be connected to a collector ring mounted on the shaft, or the same may be omitted and the conductor connected directly to the frame or bearing of the shaft.

Figure 7:
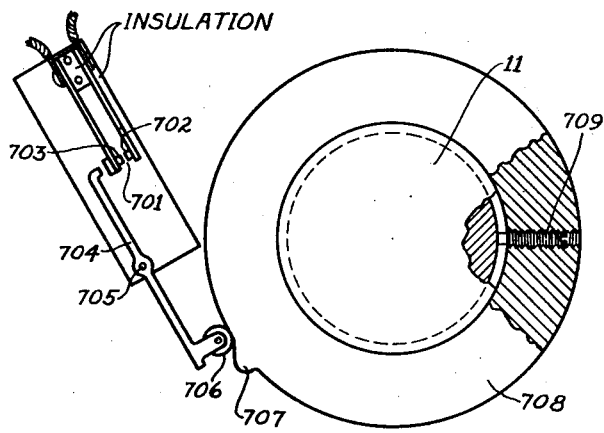
Fig. 7 is a view similar to Fig. 2 of another modification of the interlocking contact device of the invention.

In Fig. 7 still another form of the invention is shown. In this form of the invention a switch 701 is employed which has a relatively stationary contact 702 and movable contact 703. The movable contact is carried by a lever 704, pivoted at 705 to some stationary portion of the motor or a structure carried thereby. Lever 704 carries a cam follower 706 which is adapted to engage a hump or projection 707 formed on a cam 708. Cam 708 takes the place of the ring 31 of the other form of the invention and is mounted on the motor shaft 11 by means of set screws 709, the same as in the other form of the invention. Whenever the hump or projection 707 passes the cam follower 706, switch 701 is closed and the interlocking circuit 52 operated the same as with the other forms of the invention.

The advantages of my invention are manifest. With my invention it becomes possible to selectively operate either of two motors independently of each other. At the same time it becomes possible to start and synchronize either motor first and to subsequently start the other motor and synchronize the same at a predetermined relative rotor angle with respect to the first motor. In this manner the more uniform power consumption results in reducing considerably the current pulsation, vibrations and flickering of lights in buildings where the motors are operating. My invention utilizes apparatus readily available and now in common use in electric circuits so that repair and maintenance may be at a minimum. My invention can be constructed at a nominal cost.

Changes in the specific form of my invention as herein disclosed, may be made within the scope of what is claimed without departing from the spirit of my invention.

Having described my invention, what I claim as new and desire to protect by Letters Patent is:

1. In combination with two synchronous motors to be operated at predetermined relative rotor angles, a starting switch for each of said motors, an interlocking device operated by each of said motors, a normally open circuit for applying field excitation to one of said motors, a second normally open circuit for applying field excitation to the other motor, a selector switch independently operable relative to said starting switches and including movable connecting means adapted to occupy either of two operative positions, said selector switch including contacts adapted to be connected together when the connecting means is in one position for closing said first named circuit and for connecting said interlocking devices in the second named circuit, said selector switch when in said position determining the sequence of applying field excitation to said motors, said selector switch having other contacts adapted to be connected together when the connecting means is in its other operative position for closing the second named circuit and for connecting said interlocking devices in the first named circuit, said selector switch when in said latter position reversing the sequence of applying field excitation to said motors, and a synchronizing device for each of said motors.

2. In combination with two synchronous motors to be operated at predetermined relative rotor angles, a starting switch for each of said motors, an interlocking device operated by each of said motors, a normally open interlocking circuit, said interlocking devices being connected in series in said interlocking circuit, a normally open field excitation circuit for applying field excitation to one of said motors, a normally open field switch in said field excitation circuit, a normally open control circuit for controlling the operation of said field switch, a synchronizing device in said control circuit, a selector switch independently operable relative to said starting switches and including a plurality of contacts, said interlocking circuit including certain of said contacts, said control circuit including other of said contacts, a second normally open field excitation circuit for applying field excitation to the other motor, a second normally open field switch in said second field excitation circuit, a second normally open control circuit for controlling the operation of said second named field switch, and a second synchronizing device in said second named control circuit, said second named control circuit including certain of said contacts of said selector switch, said selector switch including movable connecting means adapted to occupy either of two operative positions, said connecting means when in one position connecting together the contacts of said first named control circuit and connecting the contacts of said interlocking circuit with the contacts of said second named control circuit, said movable means when in said position determining the sequence of applying field excitation to said motors, said movable connecting means when in its other operative position connecting together the contacts of said second named control circuit and connecting the contacts of said interlocking circuit with the contacts of said first named control circuit, said movable means when in said latter position reversing the sequence of applying field excitation to said motors.

CARL C. NELSON.